(12) United States Patent
Traub

(10) Patent No.: US 8,940,070 B2
(45) Date of Patent: Jan. 27, 2015

(54) FILTER DEVICE

(75) Inventor: Matthias Traub, Böblingen (DE)

(73) Assignee: Mahle International GmbH (DE)

( * ) Notice: Subject to any disclaimer, the term of this patent is extended or adjusted under 35 U.S.C. 154(b) by 208 days.

(21) Appl. No.: 13/581,223

(22) PCT Filed: Feb. 7, 2011

(86) PCT No.: PCT/EP2011/051721
§ 371 (c)(1),
(2), (4) Date: Nov. 7, 2012

(87) PCT Pub. No.: WO2011/104107
PCT Pub. Date: Sep. 1, 2011

(65) Prior Publication Data
US 2013/0042587 A1    Feb. 21, 2013

(30) Foreign Application Priority Data

Feb. 25, 2010   (DE) .......................... 10 2010 009 249

(51) Int. Cl.
*B65D 8/04*     (2006.01)
*B65D 41/06*    (2006.01)
*B01D 46/00*    (2006.01)

(52) U.S. Cl.
CPC ...... *B01D 46/0004* (2013.01); *B01D 2265/021* (2013.01); *B01D 2265/022* (2013.01); *B01D 2265/028* (2013.01)
USPC ................ 55/498; 55/385.3; 55/502; 55/503; 55/504; 220/4.13; 220/293; 220/297; 220/300

(58) Field of Classification Search
USPC ........ 55/385.3, 498, 502, 503, 504; 220/4.13, 220/293, 297, 300
See application file for complete search history.

(56) References Cited

U.S. PATENT DOCUMENTS

| 4,333,580 | A |   | 6/1982  | Sweigart, Jr. |
| 4,897,039 | A |   | 1/1990  | Uchida et al. |
| 5,676,273 | A |   | 10/1997 | Jonkers et al. |
| 5,755,842 | A | * | 5/1998  | Patel et al. ...................... 55/330 |

(Continued)

FOREIGN PATENT DOCUMENTS

| DE | 68919108 T2 | 3/1995 |
| DE | 60004456 T2 | 6/2004 |

(Continued)

OTHER PUBLICATIONS

English abstract for DE-102004029641.
English abstract for DE-102007057380.
English abstract for DE-60004456.

*Primary Examiner* — Christopher P Jones
*Assistant Examiner* — Minh-Chau Pham
(74) *Attorney, Agent, or Firm* — Rader, Fishman & Grauer PLLC

(57) ABSTRACT

A filter device is disclosed, including an air filter for a fresh air system of a motor vehicle. The filter device further include a filter housing which contains a receiving space. An annular filter element is inserted into the receiving space. The device also includes a cover for closing the receiving space. The cover is detachably fastened to the filter housing by means of a bayonet catch, so that the cover can be inserted axially into a cover receptacle formed on the filter housing and, when inserted, can be rotated between an unlocking position and a locking position.

16 Claims, 3 Drawing Sheets

(56) References Cited

U.S. PATENT DOCUMENTS

| | | | |
|---|---|---|---|
| 5,800,581 A * | 9/1998 | Gielink et al. | 55/385.3 |
| 5,803,939 A * | 9/1998 | Huning | 55/369 |
| 5,876,600 A * | 3/1999 | Matsubara et al. | 210/443 |
| 5,948,246 A * | 9/1999 | Zuk, Jr. | 210/188 |
| 6,039,778 A * | 3/2000 | Coulonvaux | 55/498 |
| 6,051,042 A * | 4/2000 | Coulonvaux | 55/498 |
| 6,402,798 B1 * | 6/2002 | Kallsen et al. | 55/385.3 |
| 7,674,308 B2 * | 3/2010 | Krisko et al. | 55/502 |
| 7,976,602 B2 * | 7/2011 | Munkel | 55/498 |
| 2002/0121519 A1 | 9/2002 | Martin et al. | |
| 2008/0229722 A1 | 9/2008 | Bauder et al. | |

FOREIGN PATENT DOCUMENTS

| | | |
|---|---|---|
| DE | 60200170 T2 | 11/2004 |
| DE | 102004029641 A1 | 1/2006 |
| DE | 60114341 T2 | 5/2006 |
| DE | 102007057380 A1 | 6/2008 |
| DE | 202007003356 U1 | 7/2008 |
| EP | 1188469 A1 | 3/2002 |
| NL | 7503452 A | 9/1976 |
| WO | WO-2009025927 A1 | 2/2009 |

* cited by examiner

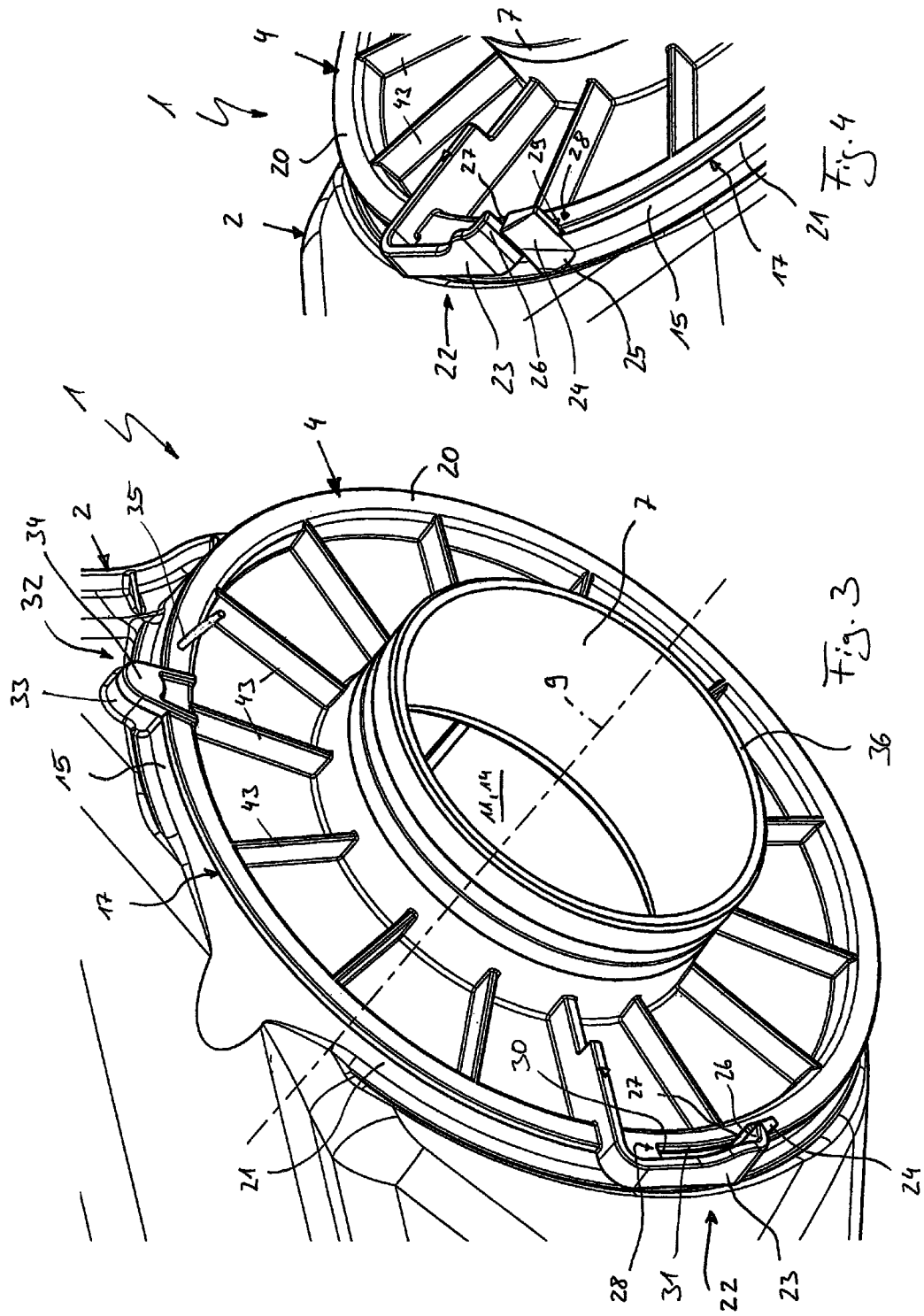

FILTER DEVICE

CROSS-REFERENCE TO RELATED APPLICATIONS

This application claims priority to German Patent Application No. 10 2010 009 249.5 filed on Feb. 25, 2010 and to PCT Application No PCT/EP2011/051721 filed on Feb. 7, 2011, the contents of which are incorporated by reference in their entirety.

TECHNICAL FIELD

The present invention relates to a filter device, particularly an air filter for a ventilation system of a motor vehicle or an internal combustion engine.

BACKGROUND

A filter device of this type is known from DE 600 04 456 T2. It comprises a filter housing which contains an accommodation space and also an annular filter element which is inserted axially into the accommodation space. Further, a lid for closing the accommodation space is present. For the known filter device, the lid is releasably fastened to the filter housing by means of a threaded closure. To this end, the lid has an external thread which can be screwed into an internal thread formed on the filter housing. To fasten and to loosen the lid, this must be rotated accordingly. For the known filter device, a securing device operating in the manner of a latch is additionally provided, which secures the screwed-in lid against rotation in the opening direction.

The problem with a configuration of this type is the fact that relatively strict production tolerances must be complied with so that the rotational movement of the lid when reaching the closed position ends precisely where the securing device can latch and effect the desired rotational securing. When the lid is opened and closed multiple times, a changed rotational position of the lid in its closed position may arise owing to wear phenomena and dirt, so rotational securing with the aid of the securing device is made more difficult.

SUMMARY

The present invention is concerned with the problem of specifying an improved or at least different embodiment for a filter device of the type mentioned at the beginning, which in particular has a high degree of functional reliability.

This problem is solved according to the invention by the subject matter of the independent claim. Advantageous embodiments of the invention form the subject matter of the dependent claims.

The invention is based on the general idea of releasably fastening the lid to the filter housing by means of a bayonet closure. A bayonet closure of this type is easy to handle and highly reliable. Furthermore, with the aid of a bayonet closure, an unlocking position and a locking position with defined relative positions between lid and filter housing, which are largely independent of wear and contaminations, can be specified.

An embodiment in which a securing device secures the lid rotated into the locking position against being rotated back into the unlocking position is therefore particularly advantageous. As the bayonet closure allows a defined relative position between lid and filter housing in the locking position, a particularly high reliability results for the securing device effective in the locking position.

In accordance with an advantageous development, the securing device may have a latching hook which is resilient in the radial direction and which, during the rotation of the lid from the unlocking position into the locking position, moves in the circumferential direction relatively to an obstacle, runs over the obstacle to reach the locking position and engages behind the obstacle in a form-fitting manner when the locking position is reached. Particularly effective rotational securing, which is activated automatically when rotating into the locking position and effectively prevents rotating back out of the locking position, is realised by means of this proposal.

An embodiment, in which a rotational limit limits the rotation of the lid in the locking direction to the locking position and/or in the unlocking direction to the unlocking position, is particularly advantageous. By providing the lid or the filter housing with a rotational limit provided in addition to the bayonet closure, the bayonet closure can be realised particularly easily in terms of design, namely without an integrated rotational limit. As a result, a functional separation between the closure function and the rotational limiting function is achieved in such a manner that the bayonet closure only fulfils the closure function, whilst the rotational limit only fulfils the rotational limiting function. As a result, the automatic production of the bayonet closure in particular can be simplified.

According to a further configuration, it can then be provided for the above-mentioned rotational limit to be integrated into the above-mentioned securing device. As a result, the securing device receives additional functionality. At the same time, the integration of the rotational limit and the securing device makes the filter device simpler to produce.

To form the rotational limit, it can expediently be provided for the obstacle of the securing device to be allowed to engage radially into a recess delimited in the circumferential direction, which is displaced in the circumferential direction when the lid is rotated relatively to the obstacle.

Of particular significance is an embodiment in which an emergency fixing device is provided, which can be activated if the securing device has failed or is defective or missing, in order to secure the lid in the locking position. As a result, a redundant fixing is provided for the rotational securing of the lid in the locking position, which fixing can then be activated if the (main) securing device is deactivated.

For example, the emergency fixing device may have a bracket formed on the housing and a tab formed on the lid and radially protruding therefrom, which tab is axially flush with the bracket in the locking position. The emergency fixing device can be activated in that a securing element, e.g. a pin or a screw passes axially through the tab and axially penetrates the bracket. To this end, the tab may be provided with a corresponding passage opening. In this case, it is possible to introduce a passage opening of this type only in the context of the activation of the emergency fixing device.

According to a particular embodiment, the lid may have a connector which projects through a central disc opening, which is constructed in an axial end disc of the filter element, into the interior of the filter element. A fluid line can be connected to the lid or to the connector thereof, which fluid line is fluid-connected in this manner to the interior of the filter element or communicates with the same. As a result, the lid may be provided with an additional function, as it has a connecting piece of the filter housing, e.g. an inlet or an outlet for the fluid, e.g. a gas or a liquid, to be cleaned with the aid of the filter element.

Further important features and advantages of the invention result from the sub-claims, from the drawings and from the associated description of the figures on the basis of the drawings.

It is to be understood that the above-mentioned features and the features which are still to be explained below, can be used not only in the respectively specified combination, but also in other combinations or alone, without departing from the scope of the present invention.

Preferred exemplary embodiments of the invention are illustrated in the drawings and are explained in more detail in the description below, identical reference numbers referring to identical or similar or functionally identical components.

BRIEF DESCRIPTION OF THE DRAWINGS

In the figures.

DETAILED DESCRIPTION

According to FIGS. 1 to 4, a filter device 1 comprises a filter housing 2, a filter element 3 and a lid 4. The filter device 1 is used for filtering a fluid. Preferably, it is provided for filtering a gas. In particular, it is an air filter or an air filter device for a ventilation system for supplying a vehicle interior and/or for supplying an internal combustion engine with fresh air.

Figure 1:
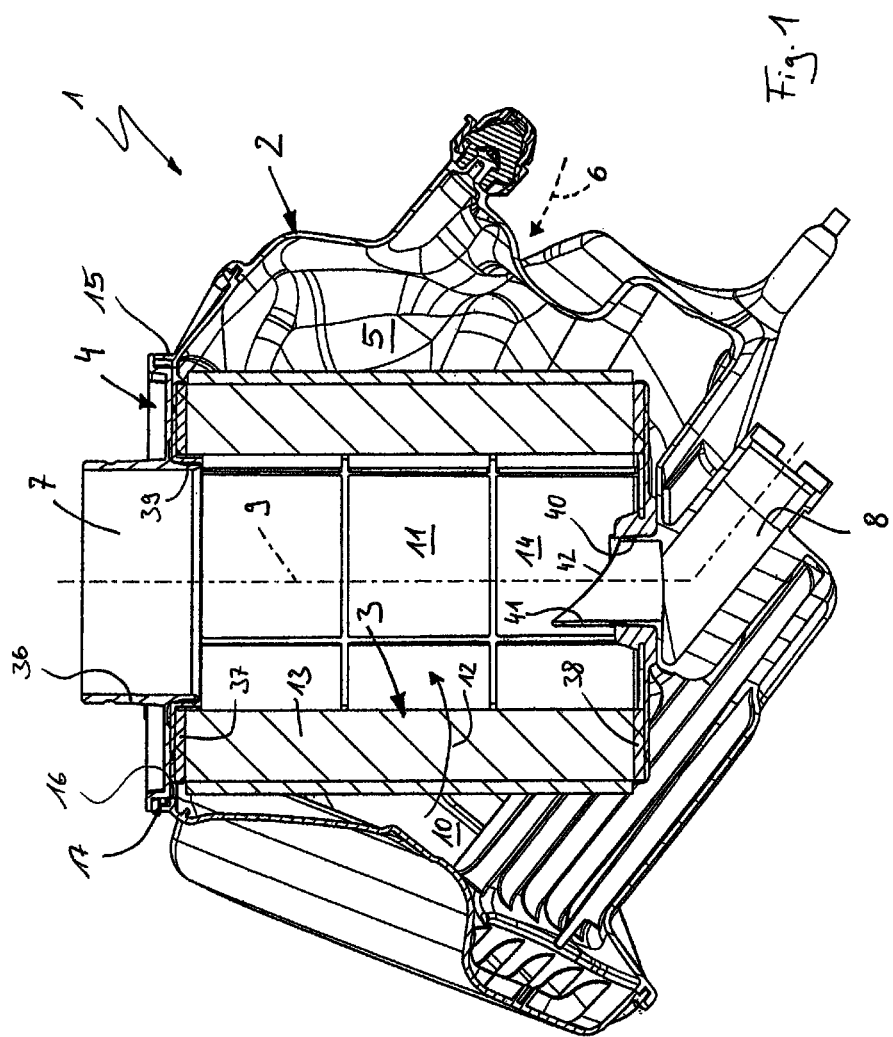
FIG. 1 schematically shows a simplified longitudinal section through a filter device, FIG. 2 schematically shows an enlarged sectional view of the filter device in the region of a lid, FIG. 3 schematically shows an isometric view of the filter device in the region of the lid, FIG. 4 schematically shows an isometric view as in FIG. 3, but in another direction of observation in the region of a securing device.

The filter housing 2 contains an accommodation space 5, into which the filter element 3 is inserted. The housing 2 has an inlet 6 covered here by the filter element 3, which inlet is indicated in FIG. 1 by means of an arrow illustrated with a dashed line. Further, the housing 2 has at least one outlet. In the example, two outlets 7 and 8, namely a primary outlet 7 and a secondary outlet 8 are provided. In the case of the particularly advantageous embodiment shown here, the primary outlet 7 is integrally formed on the lid 4, whilst the secondary outlet 8 is integrally formed on the actual filter housing 2. The primary outlet 7 leads e.g. to the internal combustion engine, whilst the secondary outlet 8 leads e.g. to an exhaust system of the internal combustion engine, for example in order to supply a catalytic converter or a particle filter with air.

The filter element 3 is of annular structure, as a result of which it has a longitudinal central axis 9 which defines the axial direction of the filter element 3 and thus also of the housing 2. The filter element 3 is axially inserted into the accommodation space 5 and separates a raw side 10 from a clean side 11 in the accommodation space 5. In the example, flow passes through the filter element 3 radially from outside to inside in accordance with an arrow 12. Accordingly, the filter element 3 envelops the raw side 10, whilst an annular filter body 13 of the filter element 3 envelops the clean side 11. The clean side 11 is thereby formed in an interior 14 of the filter element 3, which is annularly enveloped by the filter body 13. The filter body 13 consists of a suitable filter material. In particular it may be folded or pleated.

The lid 4 closes the accommodation space 5, to which end it is arranged on a lid receptacle 15 which is formed on the filter housing 2. The lid receptacle 15 encloses or borders a housing opening 16 through which the filter element 3 can be inserted into the accommodation space 5 or removed therefrom if the lid 4 is removed from the housing 2.

The lid 4 is releasably fastened to the filter housing 2 with the aid of a bayonet closure 17. In accordance with the conventional functioning of a bayonet closure 17 of this type, the lid 4 can be axially inserted into the lid receptacle 15 and can be rotated in the inserted state between an unlocking position and a locking position. The rotation of the lid 4 takes place about the longitudinal central axis 9 of the filter element 3, in the case of the rotationally symmetrical construction shown here. For the axial insertion of the lid 4 into the lid receptacle 15, the lid 4 is in this case already orientated towards the unlocking position with regards to its rotational position.

Figure 2:
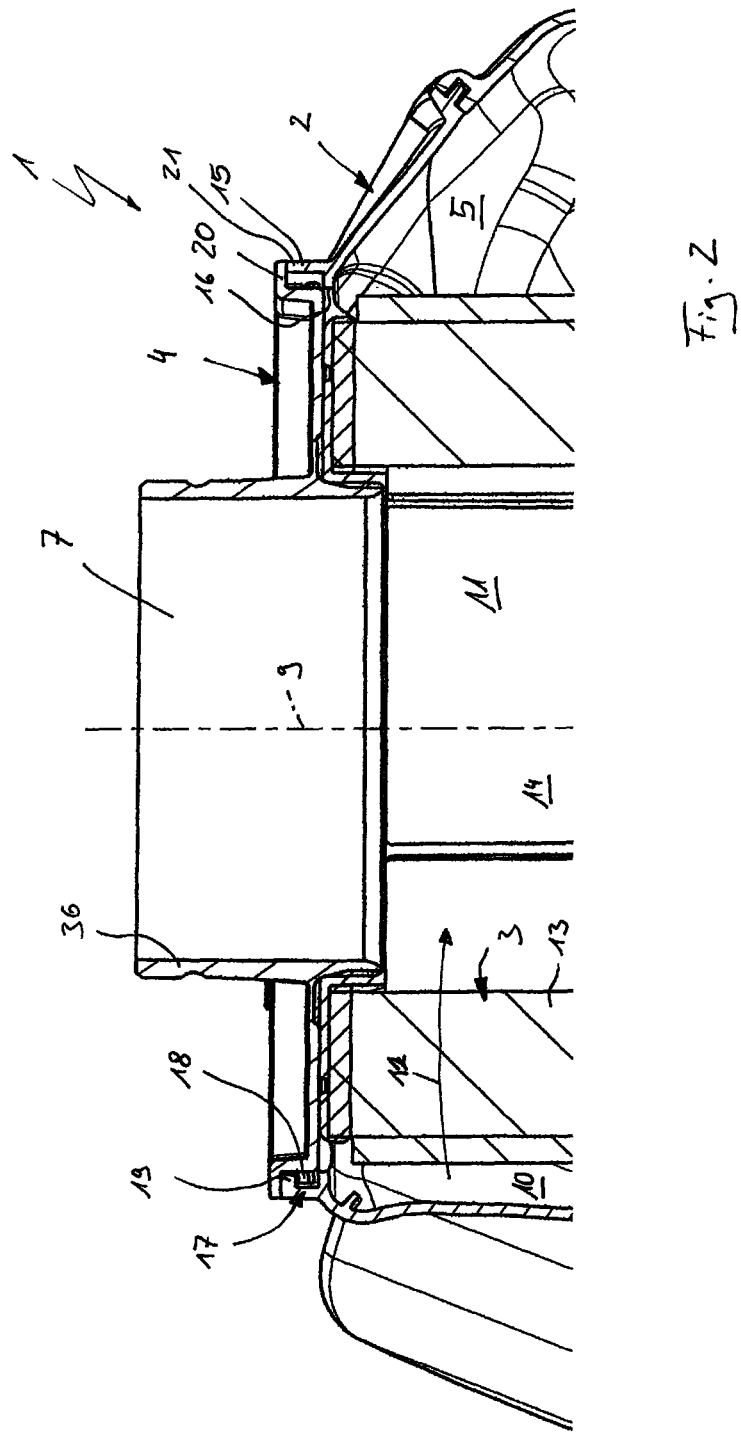

According to FIG. 2, the bayonet closure 17 has a plurality of projections 18 which radially protrude on the lid 4 and are arranged in a distributed manner in the circumferential direction. The circumferential direction here relates to the axial direction defined by means of the longitudinal central axis 9. In a manner complementary to that, the bayonet closure 17 has a plurality of holding segments 19 which radially protrude on the lid receptacle 15. In the sectional illustration of FIG. 2, only one projection 18 and one holding segment 19 can be seen in each case. Expediently, the bayonet closure 17 has three or more such pairs of projections 18 and holding segments 19.

When inserting the lid 4 into the lid receptacle 15, the projections 18 are moved axially past the associated holding segments 19. If the lid 4 is then rotated from the unlocking position into the locking position, the projections 18 move under the holding segments 19 in such a manner that the respective projection 18 engages axially behind the associated holding segment 19. It is clear that corresponding circumferential segments are present on the lid receptacle 15, which are arranged in the circumferential direction between adjacent holding segments 19 and which make it possible for the projections 18 to be moved axially past the holding segments 19.

In the example shown here, the lid 4 sits on a lid edge 20 which protrudes radially outwards and, if the lid 4 is inserted into the lid receptacle 15, sits on a collar 21 at the end, that is to say axially. The collar 21 is axially spaced from the filter housing 2 and forms an edging or border of the lid receptacle 15. The above-mentioned projections 18 of the bayonet closure 17 are formed on the lid 4 axially spaced from the lid edge 20. Furthermore, in the example, the holding segments 19 of the bayonet closure 17 are formed at the end face of the collar 21.

According to FIGS. 3 and 4, the filter device 1 according to the preferred embodiment shown here is equipped with a securing device 22. With the aid of this securing device 22, the lid 4 is secured against rotating back into the unlocking position if it is rotated into the locking position.

In the exemplary embodiment shown here, the securing device 22 has a latching hook 23 which is resilient in the radial direction. The radial direction here relates to the axial direction defined by the longitudinal central axis 9. If the lid 4 is rotated from the unlocking position into the locking position, the latching hook 23 is displaced relatively to an obstacle 24 which likewise represents a constituent of the securing device 22. To reach the locking position, the latching hook 23 runs over the obstacle 24 in the circumferential direction. When the locking position is reached, the latching hook 23 engages behind the obstacle 24 in a form-fitting manner in the circumferential direction. In the preferred example shown, the latching hook 23 is arranged on the lid 4, whilst the obstacle 24 is arranged on the filter housing 2 or on the lid receptacle 15. A reversed arrangement is also fundamentally possible. The variant shown here, in which the latching hook 23 is integrally formed on the lid 4, is preferred. It is also expedient to form the obstacle 24 integrally on the filter housing 2.

In order to facilitate the radial deflection of the latching hook 23 when running over the obstacle 24, the obstacle 24 may have a ramped side 25 in accordance with FIG. 4. When rotating the lid 4 from the unlocking position into the locking position, the latching hook 23 strikes the ramped side 25 with its radially inwardly pointing end section 26. If the lid 4 is rotated further, the end section 26 is then pushed radially outwardly along the ramped side 25. In the process, the latching hook 23 may yield resiliently. As soon as the end section 26 has completely run over the ramped edge 25 or the obstacle 24 in the circumferential direction, the resilience of the latching hook 23 effects a springing back of the latching hook 23 and of the end section 26 radially inwards, as a result of which the latching hook 23 engages behind the obstacle 24 in the circumferential direction by means of its end section 26. Should the lid 24 then be rotated back in the direction of the unlocking position, the end section 26 strikes an abutment side 27 of the obstacle 24. This abutment side 27 is radially orientated and thus effects no radial displacement of the latching hook 23.

According to the preferred embodiment shown here, the filter device 1 is additionally equipped with a rotational limit 28. This rotational limit 28 limits the rotation of the lid 4 in the locking direction to the locking position or in the unlocking direction to the unlocking position. In the example, the rotational limit 28 comprises a locking side 29 which can be seen in FIG. 4 and an unlocking side 30 which can be seen in FIG. 3. These two sides 29, 30 are formed in the example by means of the ends in the circumferential direction of a recess 31 incorporated into the lid 4 at the edge.

The two sides 29, 30 in this case interact with the obstacle 24 which is positioned on the filter housing 2 in such a manner that it engages radially into the said recess 31. In the unlocking position, the obstacle 24 comes to bear on the unlocking side 30. In the locking position, the obstacle 24 comes to bear on the locking side 29. The rotational limit 28 presented here therefore limits the rotation of the lid 4 both in the locking direction to the locking position and in the unlocking direction to the unlocking position.

Expediently, in the embodiment shown here, the rotational limit 28 is integrated into the securing device 22. This may e.g. take place in that the obstacle 24 on the one hand interacts with the latching hook 23 and on the other hand interacts with the sides 29, 30 of the rotational limit 28. In other words, to form the rotational limit 28, the obstacle 24 of the securing device 22 engages radially into the recess 31 which is delimited on the one hand in the circumferential direction by means of the unlocking side 30 and on the other hand by means of the locking side 29. If the lid 4 is rotated, the recess 31 is displaced relatively to the obstacle 24 which is immovable with respect to the housing 2.

According to FIG. 3, the filter device 1 shown here is additionally equipped with an emergency fixing device 32. If the securing device 22 has failed or is defective or missing, this emergency fixing device 32 can be activated in order to secure the lid 4 in the locking position. The securing device 22 can for example be deactivated in that the latching hook 23 and/or the obstacle 24 is/are damaged or broken off.

The emergency fixing device 32 here has a bracket 33 formed on the housing 2 and a tab 34 formed on the lid 4. The tab 34 axially protrudes from the lid 4 and is axially flush with the bracket 33 in the locking position. This emergency fixing device 32 can for example be activated in that a securing element 35, here only indicated in a rudimentary manner, passes axially through the tab 34 and axially penetrates the bracket 33. The securing element 35 may be a pin. Likewise, the securing element 35 may be a screw. A corresponding opening for introducing the securing element 35 into the tab 34 or into the bracket 33 can be introduced, depending on requirements, for activating the emergency fixing device 32. Likewise, it is fundamentally possible to provide the said opening right from the beginning at least at the tab 34.

According to the FIGS. 1 to 3, the lid 4 expediently has a connector 36 which envelops the primary outlet 7. A corresponding fluid line can be connected to this connector 36. The filter element 3 has one end disc 37 or 38 in each case at its axial ends. The respective end disc 37, 38 is connected to the filter body 13 in a sealed manner. The end disc 37 facing the lid 4 contains a central disc opening 39, through which the connector 36 projects into the interior 14 of the filter element 3. In this case, the connector 36 is expediently pushed into the end disc 37 in such a manner that in the process satisfactory sealing is produced at the same time.

Further, it can be provided for the filter element 3 to be releasably fixed to the lid 4 in such a manner that the filter element 3 is pulled out of the accommodation space 5 when the lid 4 is removed. This fixing of the filter element 3 to the lid 4 can for example be realised in that the connector 36 produces a force-fitting connection between lid 4 and filter element 3 when pushed into the disc opening 39. In addition or alternatively, a clip connection may be provided, which connects the lid 4 to the filter element 3.

In the example shown, the end disc 38 facing the secondary outlet 8 also has a central disc opening 40 which however has a smaller cross section than the disc opening 39 assigned to the primary outlet 7. A connector 41 is formed on the housing 2 in the accommodation space 5, which penetrates the disc opening 40 of the associated end disc 38 in a sealed manner as soon as the filter element 3 is correctly inserted into the accommodation space 5. The said connector 41 is provided with a beveled end face 42 in order to make it easier to feed into or find the central disc opening 40.

According to the FIGS. 3 and 4, the lid 4 is ribbed on its outer side facing away from the accommodation space 5. The individual ribs are designated 43 in this case. The ribs 43 extend from the connector 36 in the manner of a star, that is to say radially. As a result, the lid 4 has increased stability.

The invention claimed is:

1. A filter device, for a ventilation system of a motor vehicle, comprising:
   a filter housing defining a space inside the housing,
   a filter element configured to be inserted into the space,
   a lid for closing the space, wherein the lid is releasably fastened to the filter housing via a bayonet closure, such that the lid can be axially inserted into a lid receptacle formed on the filter housing and can be rotated in the inserted state between an unlocking position and a locking position, and
   a securing device for securing the lid into the locking position and preventing the lid from being rotated into the unlocking position, wherein the securing device includes a latching hook which is resilient in the radial direction and which, during the rotation of the lid from the unlocking position to the locking position, moves in the circumferential direction relative to an obstacle, runs over the obstacle to reach the locking position and engages behind the obstacle in a form-fitting manner when the locking position is reached.

2. The filter device according to claim 1, wherein a rotational limit limits the rotation of the lid in the locking direction to the locking position and in the unlocking direction to the unlocking position.

3. The filter device according to claim 2, wherein
the rotational limit is integrated into the securing device, and
wherein the rotational limit includes a locking side and an unlocking side, and the obstacle of the securing device engages radially into a recess delimited in the circumferential direction via the locking side and the unlocking side, the recess being displaced in the circumferential direction when the lid is rotated relatively to the obstacle.

4. The filter device according to claim 1, wherein the obstacle includes a ramped side which radially displaces the latching hook during the running over.

5. The filter device according to claim 4, wherein the latching hook is arranged on the lid, and may be integrally formed on the lid.

6. The filter device according to claim 1, wherein an emergency fixing device is provided, which can be activated if the securing device has failed or is defective or missing, in order to secure the lid in the locking position.

7. The filter device according to claim 6, wherein the emergency fixing device includes a bracket formed on the housing and a tab formed on the lid, the tab projecting radially from the lid and is axially flush with the bracket in the locking position, and wherein the emergency fixing device is activated via a securing element passing axially through the tab and axially penetrating the bracket.

8. The filter device according to claim 7, wherein the lid may have a connector which projects through a central disc opening, and which is formed in an axial end disc of the filter element, into an interior of the filter element.

9. The filter device according to claim 8, wherein the filter element is fixed to the lid in such a manner that when the lid is removed, the filter element is pulled out of the space, and wherein the lid may be fixed to the filter element by pushing the connector into the end disc.

10. The filter device according to claim 1, wherein the bayonet closure includes a plurality of projections which radially protrude on the lid and are arranged in a distributed manner in the circumferential direction and also, in a manner complementary to that, includes a plurality of holding segments which radially protrude on the lid receptacle.

11. The filter device according to claim 10,
wherein the lid has a lid edge which protrudes radially outwards and, when the lid is inserted, sits at the end on a collar, which protrudes axially from the filter housing,
wherein the projections are arranged axially spaced from the lid edge, and
wherein the holding segments are arranged on the end face of the collar.

12. The filter device according to claim 4, wherein a rotational limit limits the rotation of the lid in the locking direction to the locking position and in the unlocking direction to the unlocking position.

13. The filter device according to claim 1, wherein the latching hook is arranged on the lid and is integrally formed on the lid.

14. The filter device according to claim 1, wherein the lid has a connector which projects through a central disc opening, and which is formed in an axial end disc of the filter element, into an interior of the filter element.

15. The filter device according to claim 14, wherein the filter element is fixed to the lid in such a manner that when the lid is removed, the filter element is pulled out of the space, and wherein the lid may be fixed to the filter element by pushing the connector into the end disc.

16. The filter device according to claim 15, wherein the bayonet closure includes a plurality of projections which radially protrude on the lid and are arranged in a distributed manner in the circumferential direction and also, in a manner complementary to that, and include a plurality of holding segments which radially protrude on the lid receptacle.

* * * * *